United States Patent [19]

Hennequin

[11] 4,038,352
[45] July 26, 1977

[54] METHOD FOR PRODUCING SHEETS OF SMALL UNIFORM THICKNESS

[76] Inventor: Francois Maurice Hennequin, Kernascleden, 56540 Le Croisty, France

[21] Appl. No.: 512,886

[22] Filed: Oct. 7, 1974

Related U.S. Application Data

[63] Continuation-in-part of Ser. No. 390,247, Aug. 21, 1973, abandoned.

[30] Foreign Application Priority Data

Aug. 21, 1972 France .................. 72.29810

[51] Int. Cl.² .......................................... B29D 7/02
[52] U.S. Cl. ......................... 264/81; 65/65 A; 65/66; 65/182 R; 164/46; 264/DIG. 25; 264/298; 427/161
[58] Field of Search ......... 264/81, 212, 298, DIG. 36, 264/DIG. 25, 60; 65/60 R, 161, 60 C, 60 D, 182, 65, 66; 156/99, 102, 246, 382; 427/161, 166, 251; 428/432–434; 164/46, 81

[56] References Cited

U.S. PATENT DOCUMENTS

| | | | |
|---|---|---|---|
| 1,920,118 | 7/1933 | Walsh et al. | 264/298 |
| 3,317,299 | 5/1967 | Bre | 65/182 R |
| 3,441,429 | 4/1969 | Hacskaylo | 264/81 |
| 3,544,437 | 12/1970 | Loukes et al. | 65/30 R |
| 3,632,323 | 1/1972 | Robinson et al. | 65/30 R |
| 3,632,406 | 1/1972 | Clough et al. | 264/81 |
| 3,647,408 | 3/1972 | Dickinson | 65/182 R |
| 3,656,926 | 4/1972 | Loukes et al. | 65/60 |
| 3,681,042 | 8/1972 | Edwards et al. | 65/60 |
| 3,849,244 | 11/1974 | Groth | 156/99 |

Primary Examiner—Jeffery R. Thurlow
Attorney, Agent, or Firm—Wenderoth, Lind & Ponack

[57] ABSTRACT

A method for producing films wherein the material of which the film is to be formed or the constituents of that material are emitted in the vapor state under a high vacuum, the vapor is condensed to the solid state on the surface of a liquid bath, and the condensed film is then separated from the liquid.

14 Claims, 3 Drawing Figures

U.S. Patent   July 26, 1977   4,038,352
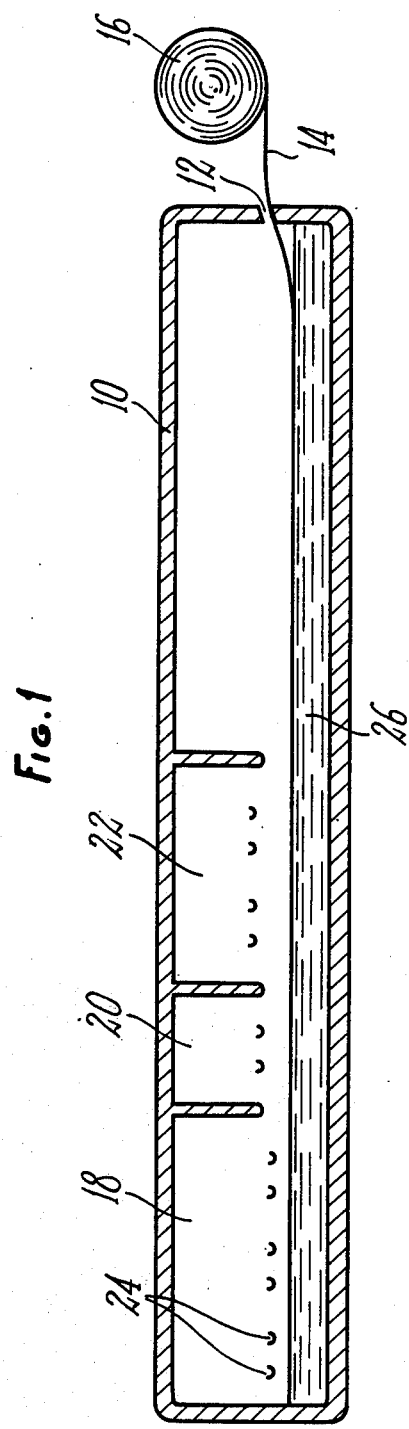
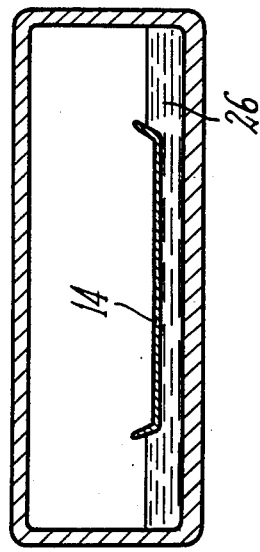
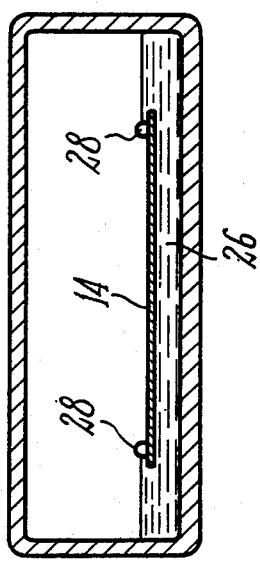

METHOD FOR PRODUCING SHEETS OF SMALL UNIFORM THICKNESS

This is a continuation-in-part of application Ser. No. 390,247, filed Aug. 21, 1973, now abandoned.

BACKGROUND OF THE INVENTION

The present invention relates to the production of very accurately plane sheets of small uniform thickness which are in the form of a sheet or strip of great length. In the description below the term "films" will be used to describe such products.

Such films, produced particularly in glass possess numerous practical applications, among which the following are examples:

The protection of plastic materials in sheet form. Certain plastics materials are limited in their use, because their surface is sensitive to scratching and to abrasion effects, or because fatty substances adhere to them, so that they are difficult to keep clean. For this use, a glass film may be applied upon the surface of the plastics sheet. A type of glass which is resistant to abrasion and to chemical attack will preferably be used for this purpose;

Joining two sheets of plastics to form composite, stratified materials. By contrast with the preceding example, the glass film will generally not be the surface of the composite material, and glass having other mechanical properties, particularly good modulus of elasticity and tensile strength, will be chosen;

The production of automobile windscreens. When glass is used for this application, it is absolutely essential that this material shall not, if it is broken, produce fragments which are capable of causing cuts or which may enter the skin or the eyes. The use of very thin glass for the rear layer of the windscreen may assist in conferring desirable fragmentation properties upon it;

The production of panes which reflect infra-red radiations. In the panes currently produced, the reflective layer is placed outside in order to prevent heating, but this arrangement leaves the reflective layer exposed to abrasion and to the weather. The use of a film of glass enables the reflective layer to be placed upon the internal surface of the film without the risk of heating up, and with the production of an excellent protective effect;

The easy and economic production of surface forms described as "ruled" due to the great flexibility of the film-type glass which enables it to adapt, by simple bending, to these forms.

Using conventional methods for the production of plane glass films, it is possible only with extreme difficulty to obtain plane sheets of thicknesses less than 500μ, at acceptable production yields.

Certain special processes do give a film-type glass by drawing. The uniformity, planeness and the regime of internal stresses of such glasses are however not satisfactory. These faults not only adversely effect the commercial quality of the product, but in addition they make it difficult to handle the glass and to store it either in stacks or in rolls, without damaging the film.

Processes of evaporation under vacuum are also known. These enable a film of glass to be deposited, which adheres directly to the pieces of plastics material to be protected. The results obtained by such methods are however not satisfactory for dimensions in excess of a few centimeters since, under the effect of physical or chemical action, the plastics and the glass undergo differential expansion and the result is a loss of adhesion or even rupture of the glass layer.

The production of thin films may have advantages for numerous materials other than glass, for example for metals. It is known that thin metal deposits may be produced on sheets of glass, plastics, or other metals. Moreover, very thin sheets of ductile metals of small dimensions may also be obtained by using various methods (such as rolling, hammering etc.). The production of films of large dimensions of certain metals or metallic oxides, where these films are independent of any support, can however involve very great difficulties. However, such a product may possess very great practical importance if it is desired to store it in film form, in order to apply it later to a support of a different material.

SUMMARY OF THE INVENTION

The present invention provides a method of producing films which comprises emitting the material of which the film is to be formed or the constituents of that material in the vapour state under a high vacuum, condensing the vapour to the solid state on the surface of a liquid bath and separating the condensed film from the liquid.

With advantage the film is separated from the liquid surface by a continuous horizontal pulling motion, while the film is floating upon the surface of the bath.

The vapour is produced by any known process. Its molecules may be neutral or ionised, and may be in a high vacuum with an atmosphere which is controlled with regard to desired pressure and/or to chemical composition of the vapour.

In a first step, the vapour is deposited upon the liquid bath by forming a tenuous veil which floats upon this bath. A second step is reached when the veil possesses a thickness sufficient to insulate the condensed vapour from the liquid bath, and when the consistency of this veil enables it to be moved by horizontal traction. From this instant onwards, the deposition of the vapour is carried out under the same physical conditions as a conventional deposition upon a solid support. However, the use of a liquid bath upon which the veil floats affords the possibility, without damaging the still very fragile veil, of moving it to transfer it into zones where it will subsequently be thickened and/or strengthened while floating.

In addition, the use of a liquid bath affords a convenient means for controlling the temperature and more generally the physical conditions of deposition, notably in the first step. This determination is a pre-requisite for chemical uniformity, the absence of internal stresses and, consequently, the good planeness of the film produced.

The material constituting the bath is selected, in each case, according to a certain number of criteria, among these there may be mentioned:

Low vapour pressure at the temperature of use;

Absence of reaction between the constituent material of the bath and that of the film, and between the bath and the atmosphere which is in contact therewith;

Homogeneity of the material constituting the bath, and cleanliness of its surface;

In some cases, good electrical conductivity of the bath surface, in order to stabilize the electrical voltage with respect to that of the vapour;

A bath density in general greater than the mean density of the film, in order to prevent any overflowing of the bath liquid resulting in submersion of the film after its initial formation step at the bath surface. To prevent this overflowing, in the case where the density of the material deposited is greater than the density of the liquid of the bath, the following solutions may be considered:

deposition upon the film, in the vicinity of the two edges, of an adhesive beading. Under these conditions, the film floats at the surface of the bath, uniformly supported by the Archimedean thrust, and the process may be carried out as in the case where the density of the film is less than that of the bath;

upward folding of the edge of the film, if the material of which it is constituted makes this possible, thus producing a result analogous to the foregoing;

treating the edge of the film with a product such that the surface tension of the bath liquid prevents it from advancing onto the film and submerging it.

It may be advantageous to use a bath at ambient temperature, and, condensation upon the walls of the enclosure can thus be reduced. Besides, ensurance is thereby provided that the film does not possess, after its manufacture, any internal tension likely to affect its planeness in an unsatisfactory manner.

Even if the bath is at a temperature which is more or less high, its liquid state enables the temperature to be easily homogenized in such a way that it remains constant along each transverse straight line of the film thus leading to an absence of deformation and internal stress, which would be caused by cooling contraction.

In order to reduce the risk of ascending or descending currents of thermal origin, it is necessary to prevent the bath from being cooler at its surface than lower down, during the operation. Local temperature variations at the surface exert a harmful effect upon the regular creation of the film and upon its plane condition. Such a result may be achieved by using a bath made up of different superimposed layers.

It will be noted that the method according to the invention does not in any way demand the previous production of a homogeneous glass, which will then be vaporized within the enclosure. It is in fact only necessary simultaneously to vaporize the various constituents of the glass, even in the form of mixtures, provided that the vaporization rates, which are maintained constant, give to the vapour the mean composition desired. Under these conditions, the method of the invention enables the conventional furnace for melting the glass to be completely eliminated.

The method of the invention makes possible the obtaining of products, in particular of glasses, having quite unusual compositions. In fact, the glasses at present produced in industry have their composition severely influenced by considerations of ease of production such as, the fusion and devitrification temperatures, the working plateau or threshold, the emission of harmful vapours, and the corrosion of the furnace refractory materials. The result is that compositions for the glass are selected which are not always satisfactory, particularly from the point of view of chemical resistance and mechanical strength.

For carrying out the present method, the selection of the material to be vaporized is influenced by considerations quite different from the foregoing, such as in particular the ease of vaporization or the existence of a liquid bath with which this material shall be compatible.

Finally, while the initial cost of the raw materials is in general an important element in glasses, due to the quantities of materials used, this, consideration may be modified by the use of glass film, as it is possible to use raw materials having a high price per kilogram, since the film has a low weight per square meter.

If it is desired that the film shall be constituted of different layers, it is possible to produce it with a high degree of precision. This may be done by isolating, above the bath, cells each containing a vapour of different composition, each partition between two cells being perpendicular to the direction of advance of the film.

If it is desired to produce a rapid change in composition between two successive layers, the partition will maintain a clear isolation between the two corresponding cells. If, on the contrary, it is desired to obtain a progressive change in composition, the partition between the two cells leaves a transition zone, in which the two vapours mix.

The vaporized material may be easily and rapidly changed, provided that this change does not lead to a change in the liquid bath, for the following reasons.

It is possible, by using known devices, to change the troughs which contain the products to be vaporized, without breaking the vacuum. For this purpose, it is advantageous always to have two troughs side by side. Absolutely continuous progress of the production is maintained in this way, if these two troughs possess identical charges, by carrying out the replacement of the exhausted trough while the other one is still in service. If, on the contrary, it is desired to change the production, one of the two troughs is charged with the new product to be vaporized, and the transition may be effected very rapidly.

If fabrication is carried out over a high temperature bath and if the distribution of the layers is not symmetrical with respect to the central layer, precautions are necessary in the production of the film, since unequal contraction in the layers during cooling would lead to a deformation of the sheet. Naturally, if the film is made up in the cold state, such precautions are not necessary.

A compressive effect may be obtained in the two faces of the film, by utilizing a generally well-known technique consisting of the deposition, at high temperature, of the stratified layers selected in such a way that the layers of the two surfaces are less contractible than the central layer or layers.

BRIEF DESCRIPTION OF THE DRAWINGS

An embodiment of a device for producing films in accordance with the invention will now be described by way of example with reference to the accompanying drawings, in which:

FIG. 1 shows such a device diagrammatically in longitudinal section; and

FIGS. 2 and 3 show, in vertical section, alternative means for preventing any overflowing of the liquid of the bath onto the top of the film.

DETAILED DESCRIPTION OF THE INVENTION

The device is constituted essentially of an enclosure 10 capable of maintaining the desired vacuum and holding a liquid bath 26. The enclosure has an opening 12 at one end to permit a film 14 formed on the surface of the bath to leave the enclosure. This opening is in the form of a rectilinear slot, since the thinness of the film ensures that it possesses quite sufficient flexibility to adapt to this arrangement. The exit slot 12 is lined with flexible bands giving a low contact pressure, for example bands of rubber, in order to reduce the ingress of air into the enclosure. Under these circumstances, it is not necessary to provide devices comprising multiple obstacles such as baffles in order to maintain a scaled opening, and the ingress of air is maintained at a very low level.

The enclosure is provided with conventional means (not shown) to produce a vacuum or a controlled atmosphere. In the illustrated embodiment, the enclosure has three cells 18, 20, 22, divided by partitions, each of these cells to contain a vapour of different composition. The products to be vaporized are charged into troughs 24 provided with heating means, movable into and out of the enclosure and arranged in pairs in order to permit one exhausted trough to be replaced while the other is still in service.

The film 14 is extracted by a continuous horizontal pulling motion and stored upon a reel 16.

In order to prevent the liquid of the bath 26 from overflowing and running over the upper face of the film 14 it is possible, either to apply an adhesive beading 28 to its edges (FIG. 2), or to fold the edges upwards (FIG. 3), or to apply to the edges of the film a substance which develops a suitable surface tension with the bath liquid 26.

It is believed to be clear to those skilled in the art, from the above discussion, that films having highly uniform geometric characteristics, i.e. constant thickness and perfect flatness, may be formed in accordance with the process of the present invention.

Films of a great many different types of material may be formed by using the present invention. Specifically, the present invention is directed to the formation of films of glass material, particularly glasses the principal constituent of which is silica or boron, and the constituents of which may be vaporized. The present invention further is directed to the formation of films of metal materials which are vaporizable and which may be deposited in crystalline form. It is believed that those skilled in the art will readily understand from the present disclosure what types of materials may be employed in carrying out the present invention.

The present invention does not include the operations of forming the vapour. The vaporization of glass constituents and metals may be carried by any one of several well known processes.

It will be apparent that the pressure within the enclosure 10 and the temperature of the liquid bath 26 will vary greatly in accordance with the material to be deposited and the process used. A general rule is that it is desirable to select the lowest possible temperature for the liquid bath 26.

Preferably, when the process involves deposition by a physical method, the bath will be of a material substantially at room temperature, and the pressure in the chamber will preferably be within the range of from $10^{-3}$ to $10^{-5}$ torr.

When deposition is by a chemical process, the temperature of the liquid bath is preferably maintained no higher than 400° C. However, this temperature in some cases will be higher since certain metals such as titanium must be deposited at temperatures of from 1200° to 1400° C. When chemical deposition is employed, the pressure within the chamber is maintained as close as possible to atmospheric pressure.

It is important that, under the particular temperature conditions employed, the vapour pressure of the material of the bath be low in relation to the pressure in the enclosure. It is necessary that the viscosity of the material of the bath be lower than 1 Poise.

The material of the liquid bath 26 will substantially be dependent upon the type of material to be deposited. Obviously, the material of the liquid bath must be a material which will not react with either the atmosphere or the material to be deposited. Examples of materials which may be employed for the liquid bath are:

Between −20° and 100° C, silicone oils having low vapour tension, such as those normally sold for use with vacuum pumps working at low pressures such as $10^{-5}$ torr.

Mercury may be employed at temperatures between −20° and 0° C.

Fused tin may be employed at temperatures higher than 260° C.

At higher temperatures, fused metal oxides, pure or in mixture, may be employed.

It will be apparent that as the film is condensed on the surface of the liquid bath, the film is advanced by sliding at a constant speed in relation to the surface of the liquid bath on which the film is floating. If this speed of advancement is too high, it will be apparent that part of the molecules of the just deposited film will not have enough cohesion to be pulled along immediately with the film, and the subsequent film thickness will be irregular. The speed of advancement of the film is generally limited to several centimeters per minute. It is of course apparent that the speed of advancement will be to a substantial degree dependent upon the type of material of the film and the rate of deposition of the vapour.

The speed of advancement of the film may be somewhat increased and the above difficulty overcome by imparting to the surface of the liquid bath a motion in the direction of movement of the film with a slightly higher speed. This movement tends to move all of the condensed molecules in a uniform manner against the beginning of the film and help their coalescence. However, if the movement of the surface of the liquid bath is too high, the initially formed film tends to fold.

It is generally intended that the process of the present invention be necessary only for the formation of a film having a thickness sufficient to be manipulated by rollers. Specifically, and depending upon the material of the film, the method of the invention is intended for the production of films having a thickness of from 50 microns to 500 microns. It is of course possible to employ the process of the present invention for the production of films having greater thicknesses, however, the unique process of the present invention is no longer necessary for the thickening of the films, since the relatively thin films produced in accordance with the present invention may be removed from the floating bath and then be thickened by known processes.

As stated above, when the deposited film has a higher density than that of the bath, overflowing of the liquid onto the upper surface of the film may be prevented by depositing on the edges of the upper surface of the film a material which forms a cushion or a dam. Such materials may be commercially available silicon putty materials, or any other material which would perform and achieve the desired and obviously intended result. Further, the edges of the upper surface of the film may be coated with a material such as a commercially available mineral jelly, when the film is at ordinary temperature, to thereby develop a sufficient surface tension with the liquid bath to prevent overflow of the bath onto the film.

It is believed that those of ordinary skill would readily be able to select suitable operating parameters for carrying out the present invention for the deposition of a film of a particular material in accordance with the present invention. Once the material of the film is selected, one of ordinary skill would readily be able to determine the material and temperature of the bath to be employed, as well as the pressure necessary in the chamber. The following are intended to be examples only, and not limitations to the scope of the present invention.

EXAMPLE 1

The deposited material consists of a glass composition ordinarily used for automobile panes. The atmosphere in the chamber is a vacuum of $10^{-4}$ torr, for a physical vaporization operation.

The deposition is made at a temperature of 20° C on a bath of silicone oil of the type commercially sold for use in vaccum pumps. The density of the glass is higher than that of oil, and therefore requires one of the above described means for preventing overflow of the oil onto the top surface of the deposited film.

EXAMPLE 2

The deposited material is aluminum vaporized by physical process. The chamber is at a pressure of $10^{-4}$ torr. The bath is silicone oil at a temperature of 20° C. The film is maintained on top of the bath by folding the edges of the film in accordance with FIG. 3 of the drawings.

EXAMPLE 3

The deposited material is cobalt which is vaporized in a known manner by use of acetylacetonate of cobalt. The atmosphere within the chamber is maintained at a pressure of 0.1 torr. The bath is fused tin at a temperature of 330° C. The film is maintained on top of the bath by folding the edges of the film upwardly in accordance with FIG. 3 of the drawings.

It will be apparent that various modifications can be made to the above specifically described parameters without departing from the spirit and scope of the present invention.

What is claimed is:

1. A method of producing solid films of materials capable of being vaporized and transformed directly from the vapor state to the solid state, said method comprising:

emitting the material, selected from the group consisting of metal material, metal oxide material and glass material, of which a film is to be formed or the constituents of such material in the vapor state under a vacuum of from $10^{-3}$ to $10^{-5}$ torr;

condensing the vapor to the solid state in the form of a film on the surface of a liquid bath maintained at a temperature appropriate for the controlled condensation of the vapor into solid without uncontrolled condensation at positions other than on the liquid bath, said liquid bath being of a material having a vapor pressure which is low in relation to the pressure of the surrounding atmosphere, said material of said liquid bath being non-reactive with the material of the film or of said surrounding atmosphere, and said material of said bath having a viscosity maintained lower than 1 Poise; and separating the thus condensed film from said surface of said liquid bath.

2. A method as claimed in claim 1, wherein said film is formed with a thickness of from 50 to 500 microns.

3. A method as claimed in claim 1, wherein said constituents of said material are emitted separately in vapor form, in proportions and at emission rates such that their simultaneous condensation upon said surface of said liquid bath forms said film.

4. A method as claimed in claim 1, wherein said constituents of said material are emitted separately in the form of vapor and are condensed in succession, a first of said constituents being condensed on said surface of said liquid baths, and the remaining of said constituents being condensed on said first constituent film and then one upon another, thereby forming a stratified film.

5. A method as claimed in claim 1, wherein the operation is carried out continuously with the film when formed being moved by traction over said surface of said bath, said film being maintained in a plane disposition and thickened while being moved over said surface of said liquid bath.

6. A method as claimed in claim 1, wherein said temperature of said liquid bath is ambient temperature.

7. A method as claimed in claim 1, further comprising folding the edges of said film upwardly as said film is formed and thereby preventing the liquid of said bath from overflowing and running over the upper face of said film.

8. A method as claimed in claim 1, further comprising applying an adhesive beading to the edges of said film and thereby preventing the liquid of said bath from overflowing and running over the upper face of said film.

9. A method as claimed in claim 1, further comprising applying to the edges of said film a substance which gives, together with the liquid of said bath, a surface tension sufficient to prevent said liquid of said bath from overflowing and running onto the upper face of said film.

10. A method as claimed in claim 1, wherein said material of said film does not go into solution with the material of said liquid bath.

11. A method as claimed in claim 1, wherein the liquid of said bath is mercury.

12. A method as claimed in claim 1 for producing films of metallic oxides in the vitreous state.

13. A method as claimed in claim 1 for producing films of glass.

14. A method as claimed in claim 1 for producing films of metal.

* * * * *